United States Patent [19]

Kawamura et al.

[11] Patent Number: 5,040,579

[45] Date of Patent: Aug. 20, 1991

[54] DEVICE FOR DETECTING LEAK IN METERING CYLINDER OF LIQUID FILLING MACHINE

[75] Inventors: Seizo Kawamura; Yoshihiro Saijo, both of Tokushima, Japan

[73] Assignee: Shikoku Kakoki Co., Ltd., Tokushima, Japan

[21] Appl. No.: 576,099

[22] Filed: Aug. 31, 1990

Related U.S. Application Data

[63] Continuation-in-part of Ser. No. 365,153, Jun. 12, 1989, abandoned.

[51] Int. Cl.$^5$ .......................... B67D 5/32; G01M 3/16
[52] U.S. Cl. ........................ 141/94; 141/65; 141/258; 73/47; 73/49.3; 92/5 R
[58] Field of Search .................. 128/202.22; 141/8, 65, 141/94, 95, 258; 73/40, 46, 47, 49.2 R, 49.2 T, 49.3, 52; 417/9; 92/5 R, 98 R, 98 D

[56] References Cited

U.S. PATENT DOCUMENTS

| | | | |
|---|---|---|---|
| 1,536,115 | 5/1925 | Lugt | 92/5 R |
| 2,352,350 | 6/1944 | Smith | 73/47 |
| 2,449,556 | 9/1948 | Kirkley | 73/40 |
| 3,031,884 | 5/1962 | Martin | 73/49.2 R |
| 3,800,586 | 4/1974 | DeLatorre et al. | 73/49.2 R |
| 4,281,777 | 8/1981 | Akens | 222/134 |
| 4,413,647 | 11/1983 | De Lorenzo et al. | 92/5 R X |
| 4,569,378 | 2/1986 | Bergandy | 141/266 |

FOREIGN PATENT DOCUMENTS 0112325 3/1977 Japan .................................... 73/49.3

Primary Examiner—Ernest G. Cusick
Assistant Examiner—Casey Jacyna
Attorney, Agent, or Firm—Armstrong, Nikaido, Marmelstein, Kubovcik & Murray

[57] ABSTRACT

In a liquid filling machine having a metering cylinder, a piston accommodated in the cylinder with a clearance formed therebetween, and a membrane closing each open end of the clearance to form a closed space, a device for detecting a leak in the metering cylinder comprising a vacuum pipe connected to the metering cylinder in communication with the closed space, an orifice plate inserted in the vacuum pipe for maintaining the interior portion of the pipe upstream from the orifice plate at a pressure lower than a predetermined value when the membrane has no leak with a standard quantity of leakage fluid flowing through the pipe and maintaining the interior portion at a pressure not lower than the predetermined value when the membrane has a leak, and a pressure sensor for detecting the pressure of the upstream interior portion of the pipe and producing a leak detection signal when the detected pressure is not lower than the predetermined pressure.

2 Claims, 5 Drawing Sheets

DEVICE FOR DETECTING LEAK IN METERING CYLINDER OF LIQUID FILLING MACHINE

This application is a continuation-in-part of application Ser. No. 365,153 filed June 12, 1989 now abandoned.

BACKGROUND OF THE INVENTION

The present invention relates to a device for detecting a leak in the membrane sealing of a metering cylinder, for use in machines having the metering cylinder and adapted to fill containers with a specified quantity of liquid such as fluid food.

Filling machines of this type are known which comprise a metering cylinder for charging a filling nozzle with a specified quantity of liquid at a time, a piston accommodated in the metering cylinder and having a skirt opposed to the peripheral wall of the cylinder with a clearance formed therebetween, and a membrane closing each open end of the clearance to form a closed space in the clearance.

The membrane has a limit of durability and is periodically replaced when exceeding the limit. However, some membranes develop a leak, such as a pinhole, before the lapse of the period. Thus, there arises a need to discontinue the operation of the machine upon detecting such a leak. The following device is used for detecting leaks.

The metering cylinder has connected thereto a vacuum pipe in communication with the closed space between the cylinder and the piston. The vacuum pipe is provided at an intermediate portion thereof with a tank equipped with a pressure gauge and an electrode rod. When air leaks, the pressure gauge as observed with the eye indicates a variation in the internal pressure of the tank, notifying the operator of the leak. If the leakage fluid is liquid, the electrode rod detects the liquid collected in the tank, indicating the leak.

When leaks are as small as pinholes, the pressure gauge fails to detect the leak accurately since the resulting variation in pressure is small. This drawback is attributable further to the fact that the piping system including the vacuum pipe inevitably permits leakage in its entirety. The electrode rod requires a considerable period of time for an amount of liquid to collect in the tank.

SUMMARY OF THE INVENTION

The main object of the present invention is to provide a device for detecting a leak in the metering cylinder of liquid filling machines free of the foregoing problems.

For use in a liquid filling machine of the type described, the invention provides a device for detecting a leak in the metering cylinder which device comprises a vacuum pipe connected to the metering cylinder in communication with the closed space, an orifice plate inserted in the vacuum pipe for maintaining the interior portion of the vacuum pipe upstream from the orifice plate at a pressure lower than a predetermined value when the membrane has no leak with a standard quantity of leakage fluid flowing through the vacuum pipe and maintaining the interior portion at a pressure not lower than the predetermined value when the membrane has a leak, and a pressure sensor for detecting the pressure of the interior portion of the vacuum pipe upstream from the orifice plate and producing a leak detection signal when the detected pressure is not lower than the predetermined pressure.

If a leak occurs in the membranes of the metering cylinder, the pressure acting on the pressure sensor increases to a level not lower than the predetermined value, whereupon the pressure sensor, detecting the increased pressure, produces a leak detection signal. Since the pressure acting on the sensor is controllable by the orifice plate, the pressure variation due to the leak in the membrane, even if small, enables the sensor to detect the leakage fluid instantaneously and accurately regardless of whether it is air or liquid.

BRIEF DESCRIPTION OF THE DRAWINGS

The drawings show an embodiment of the invention.

DESCRIPTION OF THE PREFERRED EMBODIMENT

An embodiment of the invention will be described below with reference to the drawings.

Figure 1:
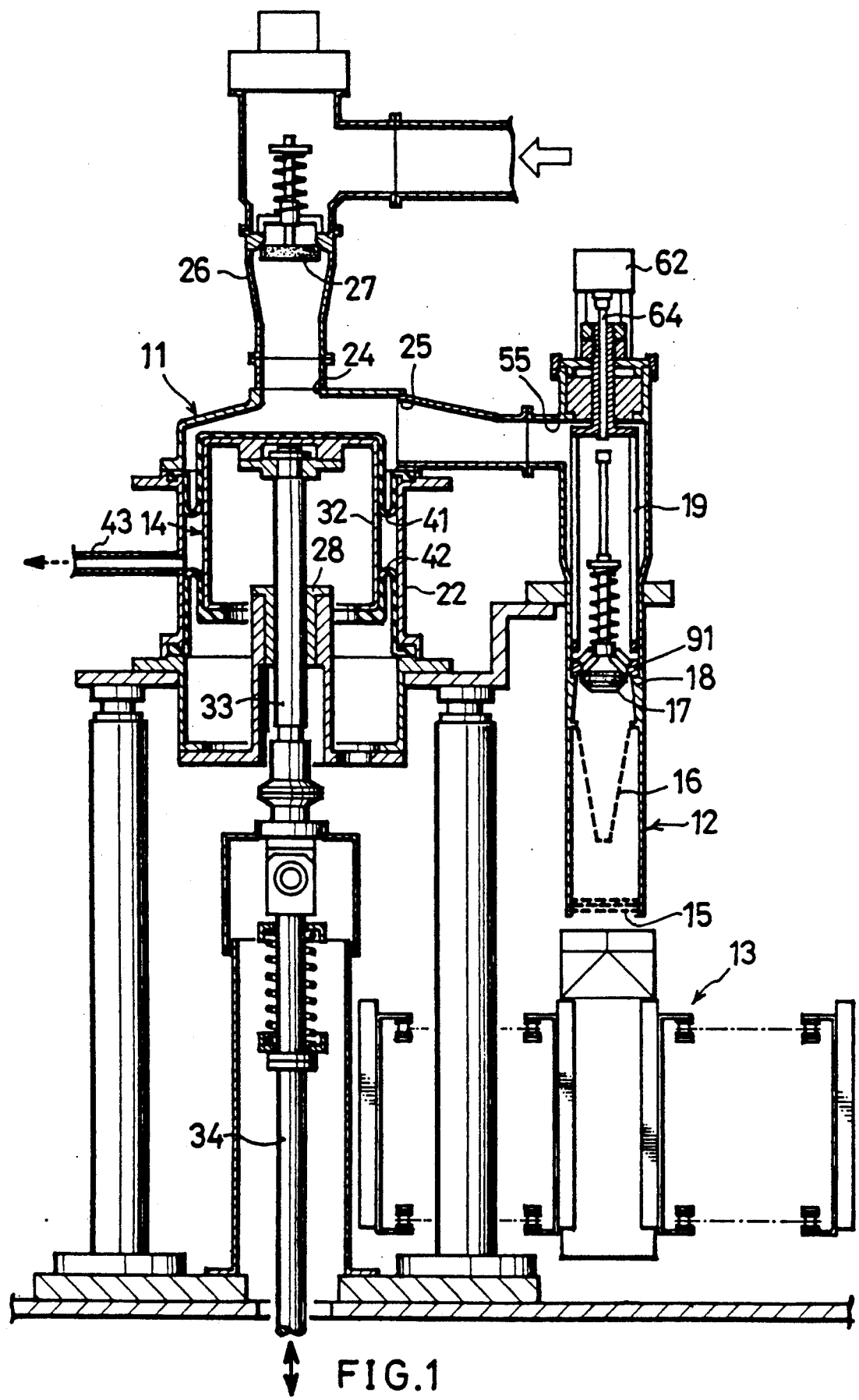
FIG. 1 is a view in vertical section.

With reference to FIG. 1, a machine for filling a specified quantity of liquid comprises a vertical metering cylinder 11 and a vertical filling nozzle 12 which are arranged side by side. The filling nozzle 12 is positioned above a path of transport of containers by a conveyor 13.

The metering cylinder 11 has a piston 14 which, when operated, forcibly feeds the liquid to be filled from the metering cylinder 11 into the filling nozzle 12. The filling nozzle 12 has a porous assembly 15 attached to its lower end and is provided with a strainer 16, lower check valve 17, lower stopper 18 and upper stopper 19 which are arranged in this order upward above the assembly 15. The porous assembly 15 is adapted to permit downward flow of the liquid forced out from the metering cylinder 11 into the filling nozzle 12 but to retain the liquid inside the filling nozzle 12 against the gravity acting on the liquid while the piston 14 is out of feeding operation. The strainer 16 serves to filter off extraneous matter, such as solid milk fat present in the liquid flowing down the nozzle 12. The lower check valve 17 acts to permit the liquid to flow downward while preventing the reverse flow thereof and is moved upward or downward by a change in the internal pressure of the metering cylinder 11 resulting from the operation of the piston 14, such that the upward movement of the valve 17 produces a negative pressure in the space between the valve 17 and the porous assembly 15 inside the filling nozzle 12, thereby preventing the liquid from dripping from the nozzle 12. The lower stopper 18 restricts the downward movement of the lower check valve 17, and the upper stopper 19 limits the upward movement of the valve 17.

Figure 2:
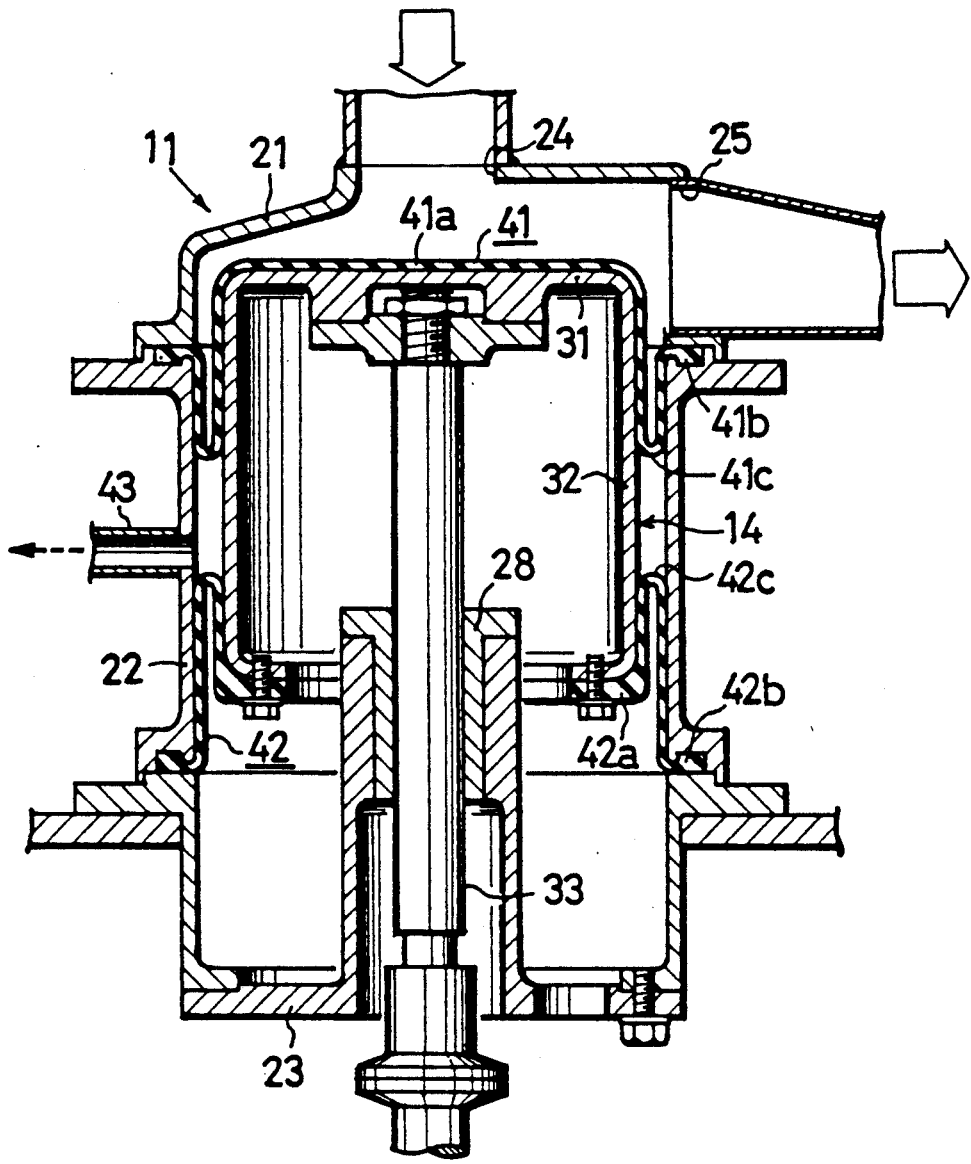
FIGS. 2 and 3 are enlarged fragmentary views in section of FIG. 1.

With reference to FIG. 2, the metering cylinder 11 comprises a top wall 21, a peripheral wall 22 and a bottom wall 23. The top wall 21 has an upward inlet port 24 and a rightward outlet port 25. The inlet port 24 communicates with an unillustrated liquid tank through a T-shaped connecting pipe 26 having an upper check valve 27 housed therein (see FIG. 1). The upper check valve 27 acts to permit flow of the liquid into the metering cylinder 11 but prevent the reverse flow thereof. The cylinder 11 is fixedly provided with a slide guide sleeve 28 projecting upward from its bottom wall 23 centrally thereof.

The piston 14 comprises a top plate 31 and a skirt 32. A piston rod 33 extending through the guide sleeve 28 has an upper end connected to the lower side of the top plate 31 centrally thereof and a lower end connected to the upper end of a vertical lift rod 34. The outside diameter of the skirt 32 is smaller than the inside diameter of the peripheral wall 22 of the metering cylinder 11 to provide a clearance therebetween. The upper and lower openings of the clearance are respectively closed with upper and lower membranes 41, 42 of an elastic material such as rubber to form a closed space between the cylinder peripheral wall 22 and the skirt 32.

The upper membrane 41 comprises a central disk portion 41a in intimate contact with the upper surface of the top plate 31, an outer flange portion 41b held between the top wall 21 of the cylinder 21 and the peripheral wall 22 thereof, and a bent portion 41c U-shaped in cross section and interconnecting the disk portion 41a and the outer flange portion 41b. The lower membrane 42 comprises an inner flange portion 42a fastened to the lower and of the skirt 32, an outer flange portion 42b held between the peripheral wall 22 of the cylinder 11 and the bottom wall 23 thereof, and a bent portion 42c generally inverted U-shaped in cross section and interconnecting the inner flange portion 42a and the outer flange portion 42b. A vacuum pipe 43 is connected to the metering cylinder 11 at an intermediate portion of the height of the peripheral wall 22 of the cylinder 11 in communication with the closed space defined by the two membranes 41, 42.

Figure 3:
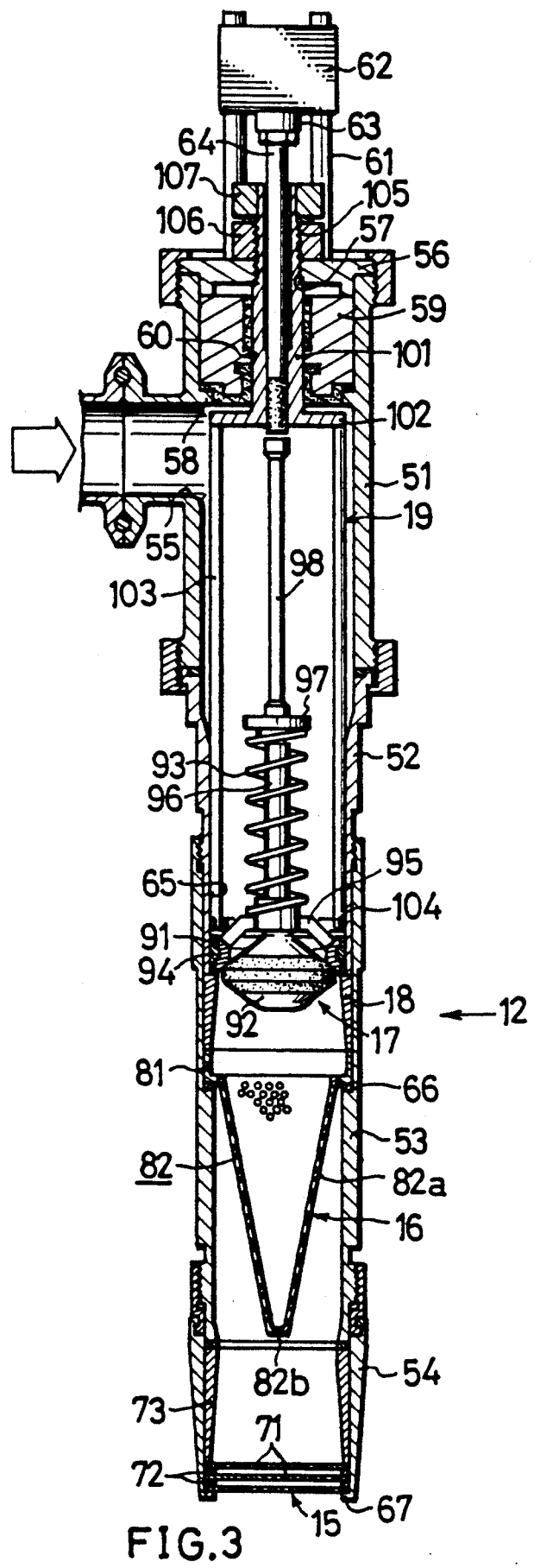
Figure 4:
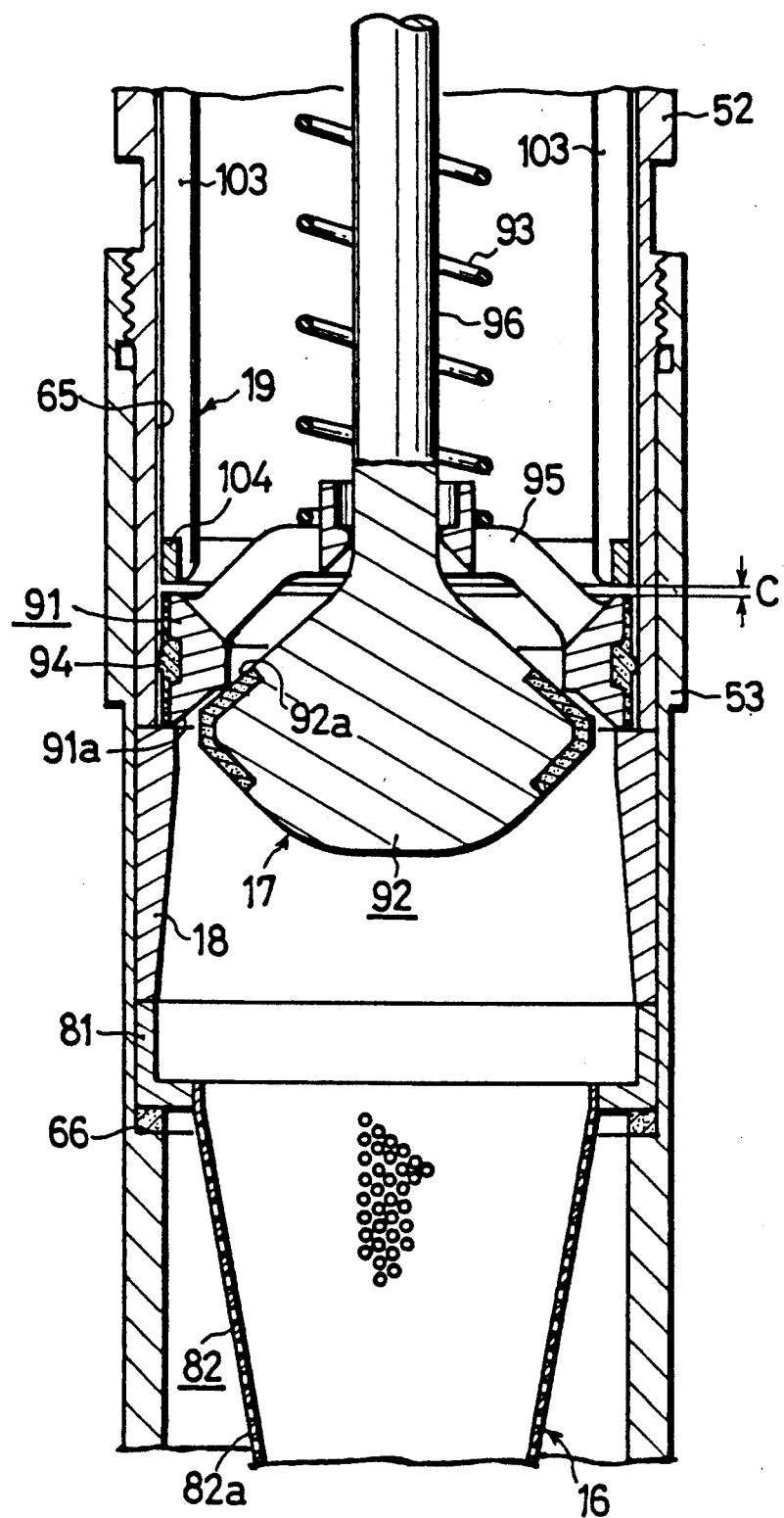
FIG. 4 is an enlarged fragmentary view in section of FIG. 3.

With reference to FIG. 3, the filling nozzle 12 comprises first to fourth four tubular members 51 to 54 connected to one another and arranged in this order from its upper end downward. The peripheral wall of the first tubular member 51 has a leftward inlet port 55 in communication with the outlet port 25 of the metering cylinder 11. The first tubular member 51 has an open upper end covered with a female screw member 56 which is internally threaded as at 57 in its central portion. Immediately above the inlet port 55, the first tubular member 51 has a flange 58 on its inner surface. A stopper guide 59 provided between the flange 58 and the female screw member 56 has a guide bore 60 coaxial with the internally threaded portion 57. A hydraulic cylinder 62 directed vertically downward is mounted on the top of the female screw member 56 by a plurality of vertical rod spacers 61. The cylinder 62 has a rod 63 connected to a valve pushing rod 64. The second tubular member 52, except for its upper end portion, has a smooth-surfaced inner periphery serving as a slide guide surface 65. The second tubular member 52 has its lower portion inserted in the upper portion of the third tubular member 53. An upward step 66 is formed in the inner surface of the third tubular member 53 approximately at the midportion of its height below the inserted lower end of the second tubular member 52. The fourth tubular member 54 has an inner flange 67 at its lower end.

The porous assembly 15 comprises a plurality of porous plates 71 arranged in parallel one above another at a spacing, and an annular spacer 72 interposed between each two adjacent porous plates 71 along their peripheries. The lowermost porous plate 71 is supported by the flange 67 of the fourth tubular member 54, and a tubular spacer 73 is provided between the uppermost porous plate 71 and the lower end of the third tubular member 54.

The strainer 16 comprises an annular frame 81 resting on the step 66 of the third tubular member 53, and a filter portion 82 attached to the inner periphery of the frame 81. The filter portion 82 is made of a porous plate and generally conical. This portion comprises a downwardly tapered peripheral wall 82a, and a flat horizontal bottom plate 82b. The porous plate corresponds to a 20-mesh metal net in porosity or opening ratio.

The lower check valve 17 comprises a valve seat 91 vertically movably fitted in the lower end of the second tubular member 52 in sliding contact with its guide surface 65 and having an upwardly tapered lower surface serving as a seat face 91a, a valve disk 92 resembling a mushroom and having an upwardly tapered face 92a in intimate contact with the seat face 91a, and a coiled compression spring 93 biasing the valve disk 92 upward. A seal ring 94 is attached to the outer periphery of the valve seat 91. The valve seat 91 is integral with a spring holder 95. The spring 93 is held between the holder 95 and another spring holder 97 fixed to a valve stem 96. A vertical rod 98 is connected to the upper end of the valve stem 96 in alignment therewith and extends to a position immediately below the valve pushing rod 64. When the pushing rod 64 is lowered by the operation of the hydraulic cylinder 62 to lower the valve disk 92, the lower check valve 17 is opened. The valve is thus opened for the removal of air, for example, when starting a filling operation.

The lower stopper 18 is in the form of a tube held between the lower end of the second tubular member 52 and the upper end of the frame 81 of the strainer 16. The valve seat 91 is prevented from moving down by coming into contact with the upper end of the stopper 18.

The upper stopper 19 comprises a contact ring 104 opposed to the valve seat 91 from above with a clearance C formed therebetween to permit the valve seat 91 to move upward or downward, four vertical ring suspending rods 103 extending upward from the ring 104 and arranged at a spacing circumferentially thereof, a connecting member 102 having radial bladelike portions and fixedly connected to the upper ends of the four suspending rods 103, and a vertical tubular rod 101 extending upward from the center of the connecting member 102 to project upward beyond the filling nozzle and having a center bore with the valve pushing rod 64 extending therethrough. The vertical rod 101 has an externally threaded upper portion 105 extending through the female screw member 56 in screw-thread engagement with the threaded portion 57 thereof and projecting upward beyond the screw member 56. A lock nut 106 is screwed on the projection. A knob 107 on the nut is fixed to the upper end of the vertical rod 101.

When the stopper 19 is rotated forward with the knob 107, with the lock nut 106 loosened, the stopper 19 lowers. The stopper 19 rises when rotated reversely. The distance the valve seat 91 is movable is thus adjusted. The negative pressure to be produced inside the filling nozzle 12 increases as this distance increases. The distance of movement is adjusted over the range of 0 to 1 mm. The distance is greater when the liquid to be filled has a higher viscosity.

Figure 5:
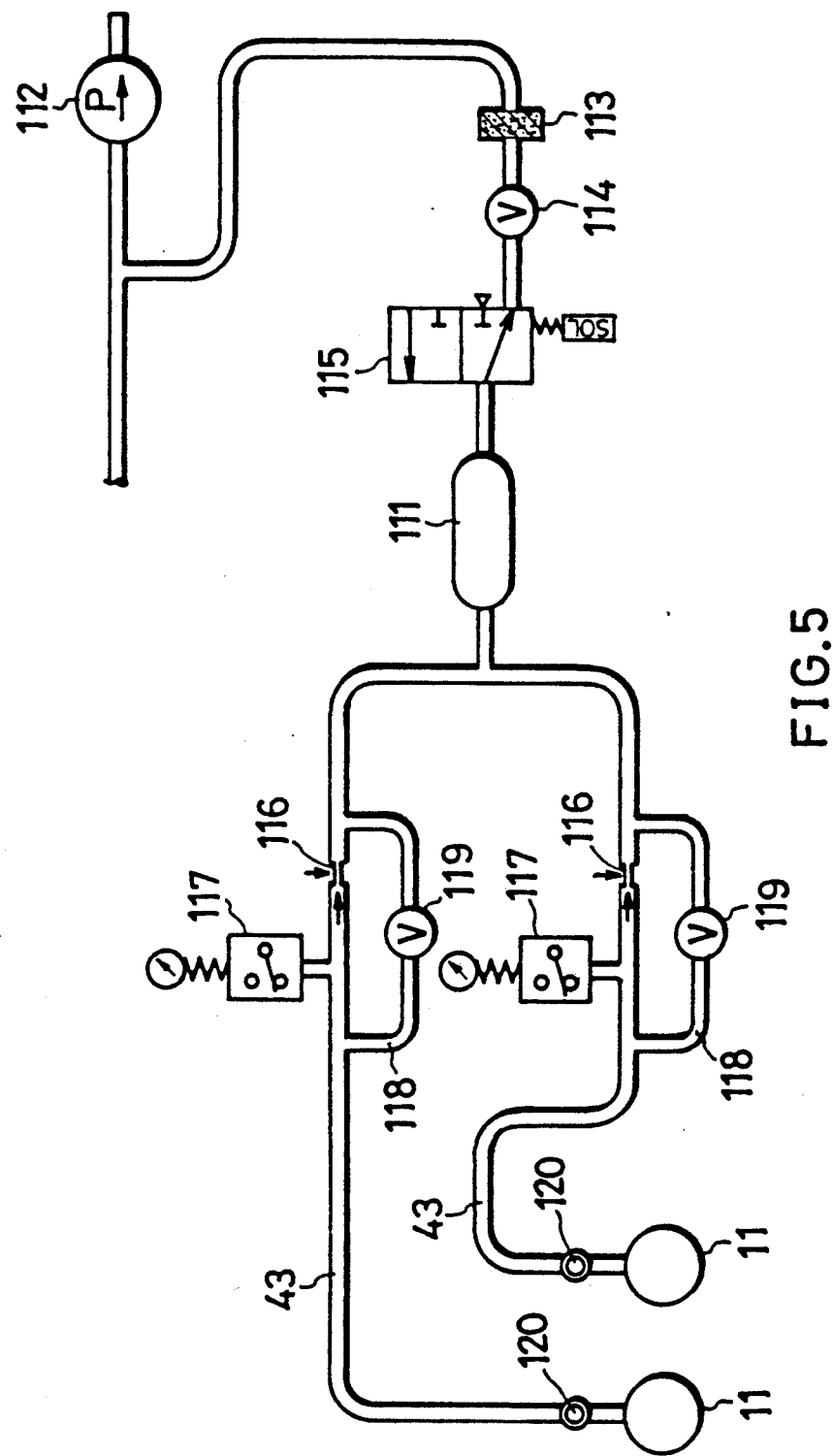
FIG. 5 is a diagram showing a piping system including a vacuum pipe.

FIG. 5 is a diagram showing a piping system including the vacuum pipe 43 connected to the metering cylinder 11. Although the diagram shows two metering cylinders 11, one or at least three metering cylinders may be used.

The two vacuum pipes 43 connected to the respective metering cylinders 11 extend separately to an air tank 111, which is provided to render the present system free from the influence of pressure variations in other system. Provided between the air tank 111 and a vacuum pump 112 are an air filter 113, a shutoff valve 114 and an electromagnetic valve 115 which are arranged in this order from the pump side toward the tank 111. When the vacuum pump 112 stops in an emergency or on completion of the operation, the electromagnetic valve 115 serves to shut off the vacuum pipe 43 for the pipe to maintain a vacuum. Arranged between the air tank 111 and each metering cylinder 11 are an orifice plate 116 adjacent to the air tank 111 and a pressure sensor 117 having a contact and adjacent to the plate 116. The orifice plate 116 and the pressure sensor 117 are provided with a bypass pipe 118 carrying a shutoff valve 119. The valve 119 is fully opened when the membranes are to be attached to the piston 14 and is thereafter completely closed. When the pressure sensor 117 detects a leak and produces the leak detection signal, the liquid filling machine is stopped and the supply of vacuum is also stopped. Then, if membranes 41, 42 are found to be broken, they are replaced. When replacement of the membranes 41, 42 is completed, the liquid filling machine is started. However, before the liquid filling machine is started, the valve 119 is opened, and the supply of vacuum is started. Consequently, vacuum is supplied through the valve 119, and applied to the membranes 41, 42. Immediately thereafter, within about 10 seconds, for example, the pressure in the upstream from the vacuum pipe reaches a steady state pressure which is lower than a predetermined pressure. It is noted that if the valve 119 is not provided, the vacuum is applied to the membranes 41, 42 only through the orifice when the membranes 41, 41 are replaced; thus, the pressure takes several minutes to reach steady state, thereby requiring the liquid filling machine to be stopped at this period of time, and subsequently resulting in a waste of time. The vacuum pipe 43 has a sight glass 120 close to the metering cylinder 11 for visually observing therethrough liquid leakage from the membrane 41 or 42.

The vacuum pipe 43 has many unillustrated unions and couplers and inevitably permits leakage. The amount of this leakage will be referred to as a "standard quantity of leakage."

When the membranes 41 and 42 have no leak with the standard quantity of leakage fluid flowing through the vacuum pipe 43, the pressure acting on the pressure sensor 117 is maintained at a value lower than a predetermined value, e.g. below 20 mm Hg, by the orifice plate 116. The orifice plate 116 is one having an orifice diameter of 0.2 to 1.0 mm, as suitably selected in accordance with the standard quantity of leakage. When the pressure acting on the pressure sensor 117 increases to a level not lower than the predetermined value, the contact of the sensor is closed to produce an electric signal. If a leak, such as a pin hole occurs in the membrane 41 or 42, the pressure on the sensor 117 instantaneously increases, for example, to about 60 mm Hg. Upon detecting the increased pressure, the sensor 117 produces a signal serving as a leak detection signal. In response to the detection signal, the filling machine is brought out of operation.

While the invention has been particularly shown and described in reference to preferred embodiments thereof, it will be understood by those skilled in the art that changes in form and details may be made therein without departing from the spirit and scope of the invention.

What is claimed is:

1. A liquid filling machine comprising:
   a metering cylinder having a peripheral wall for charging a filling nozzle with a specified quantity of liquid at a time;
   a piston accommodated in the metering cylinder and having a skirt opposed to the peripheral wall of the cylinder with a clearance formed therebetween;
   a membrane for closing each open end of the clearance to form a closed space within the clearance; and
   means for detecting a leak in the metering cylinder, wherein the detecting means includes:
   a vacuum pipe connected to the metering cylinder in communication with the closed space,
   an orifice plate means inserted in the vacuum pipe for maintaining the interior portion of the vacuum pipe upstream from the orifice plate at a pressure lower than a predetermined value when the membrane has no leak with a standard quantity of leakage fluid flowing through the vacuum pipe and for maintaining the interior portion of the vacuum pipe at a pressure higher than the predetermined value when the membrane has a leak,
   a pressure sensor means for detecting the pressure of the interior portion of the vacuum pipe upstream from the orifice plate,
   a means connected to said vacuum pipe for producing a leak detection signal when the detected pressure is higher than the predetermined pressure, and
   a bypass pipe means for bypassing the orifice plate means and the leak detection signal producing means, the bypass pipe means having one end operably connected to a portion of the vacuum pipe upstream from the leak detection signal producing means and another end operable connected to another portion of the vacuum pipe downstream from the orifice plate means.

2. The liquid filling machine as defined in claim 1, wherein said detecting means further includes:
   a shutoff valve provided on the bypass pipe.

* * * * *